(12) United States Patent
Imanishi

(10) Patent No.: US 6,921,783 B2
(45) Date of Patent: Jul. 26, 2005

(54) FLAME RETARDANT POLYOLEFIN RESIN COMPOSITION

(75) Inventor: Shinichiro Imanishi, Hyogo (JP)

(73) Assignee: Daicel Chemical Industries, Ltd., Osaka (JP)

(*) Notice: Subject to any disclaimer, the term of this patent is extended or adjusted under 35 U.S.C. 154(b) by 0 days.

(21) Appl. No.: 10/174,093

(22) Filed: Jun. 18, 2002

(65) Prior Publication Data
US 2003/0022968 A1 Jan. 30, 2003

(30) Foreign Application Priority Data

Jun. 29, 2001 (JP) ........................................ 2001-198262
Sep. 12, 2001 (JP) ........................................ 2001-276225

(51) Int. Cl.⁷ ................................................ C08K 5/34
(52) U.S. Cl. ...................... 524/100; 524/405; 524/430; 524/437; 524/442
(58) Field of Search ................................ 524/100, 405, 524/430, 437, 442

(56) References Cited

U.S. PATENT DOCUMENTS 6,369,137 B2 * 4/2002 Kersjes et al. .............. 524/100

FOREIGN PATENT DOCUMENTS

| EP | 0 992 566 | 4/2000 |
|----|-----------|--------|
| EP | 1 164 160 | 12/2001 |
| GB | 1 497 855 | 12/1978 |
| JP | 59-147050 | 8/1984 |
| JP | 60-36542 | 2/1985 |
| JP | 60-35947 | 8/1985 |
| JP | 61-106643 | 5/1986 |
| JP | 1-193347 | 8/1989 |
| WO | WO 00/02869 | 1/2000 |
| WO | WO 01/10944 | 12/2001 |

* cited by examiner

*Primary Examiner*—Kriellion A. Sanders
(74) *Attorney, Agent, or Firm*—Flynn, Thiel, Boutell & Tanis, P.C.

(57) ABSTRACT

To provide a flame retardant polyolefin resin composition with an excellent flame retardancy and enabling the preparation of a molded product free from soapiness, a flame retardant polyolefin resin composition contains (A) 100 parts by mass of a polyolefin resin, (B) 10 to 60 parts by mass of melamine polyphosphate and (C) 10 to 60 parts by mass of a carbonizing agent, wherein the compounding ratio of the component (B) to the component (C) (mass ratio) is in a range from 0.5 to 4.5, and optionally further includes (D) 1 to 30 parts by mass of a carbonizing promoter.

12 Claims, No Drawings

FLAME RETARDANT POLYOLEFIN RESIN COMPOSITION

FIELD OF THE INVENTION

The present invention relates to a flame retardant polyolefin resin composition and a molded article obtained therefrom.

PRIOR ART

Polyolefins are widely used as plastics which have superior moldability, solvent resistance and mechanical strength, possess a low specific gravity and are inexpensive in the fields of automobile parts, electric/electronic parts, electric products for domestic use and the like. As measures for making polyolefins flame-retardant, it has been widely known to compound an inorganic flame retardant represented by magnesium hydroxide and aluminum hydroxide and a halogen type flame retardant represented by decabromodiphenyl ether.

However, when an inorganic type flame retardant is used, an intended level of flame retardant effect is obtained with difficulty at present if it is not compounded in an amount equal to or more than that of the subject base resin. The use of the inorganic type flame retardant not only impairs the lightness of the resin, mechanical strength, cost performance and the like but also gives rise to problems such as a reduction in fluidity during molding processing. As to the proportion of the halogen type flame retardant, a relatively small proportion is enough to be able to accomplish an intended level of flame retardation. However, as it is assumed to be possible that poisonous gas such as dioxin is generated when the resin compositions are wasted and burned, the use of the halogen type flame retardant has been avoided recently. Also, there is a fear as to the problem of the corrosion of molding machines caused by gas and smoke derived from the halogen compounds.

Thus, the development of non-halogen type flame retardants are being forwarded. For example, it is disclosed to compound a condensed phosphoric acid compound such as ammonium carbamylpolyphosphate and a nitrogen type complex phosphoric acid compound comprising a triazine compound such as a melamine powder, for example, in the publication of JP-A-61-106643, a system consisting of ammonium polyphosphate and a 1,3,5-triazine derivative is disclosed in the publication of JP-B-60-35947, publication of JP-A-59-147050 and publication of JP-A-1-193347 and a composition comprising ammonium polyphosphate and a polyhydroxy low molecular compound such as pentaerythritol is disclosed in the publication of JP-A-60-36542.

However, these prior technologies have problems such as reduced material qualities caused by the compounding of a flame retardant, the contamination of a mold during molding and unacceptable appearance and soapiness of the surface of molded articles and are hence unsatisfactory.

In order to improve the water resistance of polyphosphate (e.g., ammonium polyphosphate), those which have an increased degree of polymerization and are surface-coated are put on the market. However, the level of water resistance is still insufficient and melamine resins which are frequently used for the surface coating are unsuitable because these resins are, for instance, decomposed due to the low heat stability when the resins are melted and kneaded.

It is an object of the present invention to provide a flame retardant polyolefin resin composition which does not contaminate a mold during molding and brings about no soapiness of molded articles and also a molded article obtained from the composition.

DISCLOSURE OF THE INVENTION

The inventor of the present invention has repeated studies to improve the contamination of a mold during molding and a soapiness of molded articles while keeping superior flame retardation and as a result, found that the above problem can be solved by using melamine polyphosphate in place of ammonium polyphosphate as a flame retardant component and also found that a more excellent effect is obtained by setting the ratio of peak areas in NMR spectra of the degree of polymerization of the aforementioned melamine polyphosphate to a specified range to complete the present invention.

The invention provides a flame retardant polyolefin resin composition having an excellent flame retardancy and enabling the preparation of a molded product free from soapiness.

The flame retardant polyolefin resin composition of the invention comprises (A) 100 parts by mass of polyolefin resin, (B) 10 to 60 parts by mass of melamine polyphosphate and (C) 10 to 60 parts by mass of a carbonizing agent, wherein the compounding mass ratio (B)/(C) of the component (B) to the component (C) is in a range of from 0.5 to 4.5, and optionally further includes (D) 1 to 30 parts by mass of a carbonizing promoter.

The invention further provides a molded article obtained from the flame retardant polyolefin resin composition defined above.

Examples of the polyolefin resin as the component (A) used in the present invention may include homopolymers of α-olefins such as ethylene, propylene, 1-butene, 1-pentene, 1-hexene, 1-heptene, 1-octene and 3-methylbutene-1,4-methylpentene-1 or random or block copolymers of these α-olefins, or copolymers which contain α-olefins as major components (preferably 50 mass % or more) and are obtained by copolymerizing these α-olefins with other monomers.

Examples of the other monomers may include dienes such as butadiene, isoprene, dicyclopendiene, 1,4-hexadiene, 4-ethylidene-2-norbornene and dicyclopentadiene, unsaturated acids such as acrylic acid, methacrylic acid, maleic acid, vinyl acetate, methylmethacrylate and maleic acid imide or their derivatives and aromatic alkenyl compounds such as styrene and α-methylstyrene. These compounds may be used either singly or in combinations of two or more.

As the component (A), although amorphous or crystalline polyolefins may be used, those exhibiting crystallinity are preferable. Among these compounds, polyethylene, polypropylene, poly(1-butene), ethylene-propylene copolymers, poly(3-methylbutene-1) and poly(4-methylpentene-1) are desirable.

Melamine polyphosphate as the component (B) used in the present invention is a melamine polyphosphate or its condensate and includes melam polyphosphate and melem polyphosphate besides melamine polyphosphate.

The above melamine polyphosphate as the component (B) is preferably those in which the ratios between the area of a peak a detected in a range from +5 to −5 ppm, the area of a peak b detected in a range from −5 to −17 ppm and the area of a peak c detected in a range from −17 to −32 ppm fulfill the following relationships (I) and (II) in a solid NMR spectrum (measurement according to a DD-MAS method)

using, as the observation nucleus, phosphorous of melamine polyphosphate which is the component (B).

More in detail, the degree of polymerization of the melamine polyphosphate as the component (B) is measured by solid NMR (DD-MAS (Dipolar Decoupling-Magic Angle Spinning) method in which 85-% aqueous phosphoric acid is used as a reference ($\delta$ 0 ppm)) using, as the observation nucleus, phosphorous of melamine polyphosphate.

(I) area of peak b/area of peak c$\geq$2;

(II) area of peak a/(area of peak b+area of peak c$\leq$0.1.

The area ratio of the above (I) is more preferably 3 or more and still more preferably 3.5 or more. The area ratio of the above (II) is more preferably 0.08 or less and still more preferably 0.05 or less. When each of the area ratios of the above (I) and (II) does not fulfill the above value range, the soapiness of the surface of a molded article is intensified when the composition is melted and kneaded to carry out molding.

The proportion of the component (B) is 10 to 60 parts by mass, preferably 10 to 50 parts by mass and more preferably 10 to 45 parts by mass based on 100 parts by mass of the component (A). When the proportion is 60 parts by mass or less, the mechanical strength of the composition is not reduced whereas when the proportion is 10 parts by mass or more, the formation of a carbonized layer is sufficient at the time of burning to develop flame retardation.

As the carbonizing agent used as the component (C) in the present invention, those selected from condensates of dimers or higher polymers of pentaerythritol and their esters are preferable. One or more types selected from pentaerythritol and its ester, dipentaerythritol and its ester and tripentaerythritol and its ester are more preferable.

The component (C) contains, as its major components, the aforementioned condensate of pentaerythritol and the like (preferably 80 mass % or more) and may be balanced by compounding other carbonizing agents.

Examples of the other carbonizing agent may include polyols such as pentaerythritol, cellulose, maltose, glucose, arabinose, ethylene glycol, propylene glycol, polyethylene glycol and ethylene/vinyl alcohol copolymers; or ester compounds produced by reacting these polyol components with carboxylic acids; melamine, other melamine derivatives, guanamine or other guanamine derivatives and triazine type derivatives such as melamine(2,4,6-triamino-1,3,5-triazine), isocyanuric acid, tris(2-hydroxyethyl)isocyanuric acid, tris(hydroxymethyl)isocyanuric acid, tris(3-hydroxypropyl) isocyanurate and tris(4-hydroxyphenyl)isocyanurate.

Although no particular limitation is imposed on the form of the component (C), powders to granules having an average particle diameter preferably less than 50 $\mu$m, more preferably less than 40 $\mu$m and still more preferably less than 30 $\mu$m are desirable in the present invention.

The proportion of the component (C) is 10 to 60 parts by mass, preferably 15 to 50 parts by mass and more preferably 15 to 45 parts by mass based on 100 parts by mass of the component (A). When the proportion is 60 parts by mass or less, the mechanical strength of the molded article is not reduced and soapiness of the surface does not occur whereas when the proportion is 10 parts by mass or more, a carbonized layer is sufficiently formed at the time of burning to develop flame retardancy.

In the composition of the present invention, the compound ratio (mass ratio) of the component (B) to the component (C) is in a range from 0.5 to 4.5, preferably 1 to 4 and more preferably 1 to 3 to improve flame retardancy.

Examples of the carbonizing promoter as the component (D) used in the present invention may include organic metal complex compounds such as ferrocene, metal hydroxides such as cobalt hydroxide, magnesium hydroxide and aluminum hydroxide, alkali earth metal borates such as magnesium borate and calcium magnesium borate, metal oxides such as manganese borate, zinc borate, zinc metaborate, antimony trioxide, alumina trihydrate, nickel oxide, manganese oxide, titanium oxide, silicon oxide, cobalt oxide and zinc oxide, aluminosilicates such as zeolite, silicate type solid acids such as silica titania, metal phosphates such as calcium phosphate, magnesium phosphate, aluminum phosphate and zinc phosphate and clay minerals such as hydrotalcite, kaolinite, sericite, pyrophyllite, bentonite and talc.

The proportion of the optional component (D) is 1 to 30 parts by mass, preferably 0.5 to 10 parts by mass and more preferably 0.5 to 5 parts by mass based on 100 parts by mass of the component (A). When the proportion is 30 parts by mass or less, the flame retardant effect is not reduced, unstable extrusion is not caused and the mechanical characteristics are not reduced whereas when the proportion is 1 part by mass or more, flame retardancy is developed.

In the present invention, components other than the aforementioned components (A) to (C) or (A) to (D) may be compounded according to the need.

Examples of a foaming agent among other components include compounds selected from nitrogen-containing compounds, for example, melamine derivatives such as melamine, melamine formaldehyde resins, methylol melamine having 4 to 9 carbon atoms and melamine cyanurate, urea derivatives such as urea, thiourea, (thio) urea-formaldehyde resins and methylol(thio)urea, having 2 to 5 carbon atoms, guanamines such as benzoguanamine, phenylguanamine, acetoguanamine and succinylguanamine, reaction products between guanamines and formaldehyde, dicyandiamide, guanidine and guanidine sulfamate.

Examples of various phosphates among the above other additives may include triphenyl phosphate, tricrezyl phosphate, trixylenyl phosphate, tris(isopropylphenyl) phosphate, tris(o- or p-phenylphenyl) phosphate, trinaphthyl phosphate, crezyldiphenyl phosphate, xylenyldiphenyl phosphate, diphenyl(2-ethylhexyl) phosphate, di(isopropylphenyl)phenyl phosphate, o-phenylphenyldicrezyl phosphate, tris(2,6-dimethylphenyl)phosphate, tetraphenyl-m-phenylene diphosphate, tetraphenyl-p-phenylene diphosphate, phenylresorcin polyphosphate, bisphenol A-bis (diphenylphosphate), bisphenol A polyphenyl phosphate and dipyrocatechol hypodiphosphate. Other than the above, as fatty acid aromatic phosphates, orthophosphates such as diphenyl (2-ethylhexyl) phosphate, diphenyl-2-acryloyloxyethyl phosphate, diphenyl-2-methacryloyloxyethyl phosphate, phenylneopentyl phosphate, pentaerythritoldiphenyl diphosphate and ethylpyrocatechol phosphate and mixtures of these compounds may be exemplified.

A filler may be compounded in the composition of the present invention corresponding to uses and the like. The filler is preferably used generally for reinforcing thermoplastic resins. Examples of these fillers include fiber fillers, flake fillers, plate fillers and powder fillers. As the filler, glass, carbon, silicon-containing compounds, metal compounds such as potassium titanate, synthetic resins and organic types such as cellulose fibers may be used. In the case of inorganic fillers, it is preferable to carry out surface treatment using a silane, epoxy, acryl or titanate coupling agent to improve adhesion to a resin component.

In the composition of the present invention, stabilizers to heat, light, or oxygen (e.g., antioxidants such as phenolic type compounds and phosphorous type compounds, ultraviolet absorbers such as benzotriazole type compounds, benzophenone compounds and phenyl salicylate and heat stabilizers such as hindered amine type stabilizers, tin compounds and epoxy compounds), plasticizers, sliding characteristic improvers such as polydimethylsiloxane, lubricants, releasing agents, antistatic agents and colorants and the like may be compounded.

The composition of the present invention may be obtained by kneading using a melt-kneading machine such as a Bumbury mixer, open roll, kneader or single or twin extruder or by mixing using a Henschel mixer, tumbler mixer or the like and then by kneading using the aforementioned melt-kneader.

According to the composition of the present invention, a molded article having superior flame retardancy is obtained and a molded product reduced in soapiness can be provided corresponding to use.

EXAMPLE

The present invention will be further explained by way of examples, which, however, are not intended to be limiting of the present invention.

Examples 1 to 8, Comparative Examples 1 to 4

Using a kneader (Laboplast Mill 50R150 Model, manufactured by Toyo Seiki Co., Ltd.), a resin composition with the formulation (indicated by parts by mass) shown in Table 1 was prepared. The kneading temperature was 220°C., the number of revolutions was 50 rpm and the kneading time was 5 minutes. The resulting composition was press-molded into a plate 3 mm in thickness. The plate was cut down to an appropriate size for a test. The details of the components to be used and test methods are as follows.
(1) Components to Be Used
Components in Examples
Component (A)
Polypropylene: Grand Polypro J713M manufactured by Grand polymer Co., Ltd.
Component (B)
Melamine polyphosphate-1: Melapur 200 manufactured by DSM, area ratio of (I)=3.98, area ratio of (II)=0.04 and P (Phosphorous) content: 15%.
Melamine polyphosphate-2: Apinone MPP-A manufactured by Sanwa Chemical Co., Ltd., area ratio of (I)=0.7, area ratio of (II)=0.16 and P content: 15%.
Component (C)
Dipentaerythritol: "Dipentorit" manufactured by Koei Chemical Co., Ltd.
Adipate of dipentaerythritol: Plenlizer ST210 manufactured by Ajinomoto Fine-Techno Co. Inc.
Tripentaerythritol: Reagent (manufactured by Acros Organics)
Component (D)
Zinc borate: "Firebreak ZB" manufactured by U.S. Borax Inc.
Manganese oxide: Reagent manufactured by Kanto Kagaku
Crystalline aluminosilicate: Molecular sieve 3A (LZY 54 manufactured by Nikki-Universal Co., Ltd.)
Components of Comparative Examples
Ammonium polyphosphate-1: Exolit AP422 manufactured by Clariant GmbH
Ammonium polyphosphate-2: Taien S manufactured by Taihei Chemicals Ltd.
(2) Test method
(2-1) Flame retardancy A vertical firing test prescribed in UL-94 was carried out. Width: 6 mm and thickness: ⅛ inch (about 3 mm)

The sample was held for 10 seconds twice in flame to measure the time required until the fire went out each time when the flame was removed. The conformity of V-0 satisfies the following required particulars (a) to (e). (a) All test species do not burn for a time longer than 10 seconds, (b) the total time required for burning ten times in each group of five test specimens does not exceed 50 seconds, (c) all test specimens do not burn accompanied by burning extending to the support clump, (d) all test specimens do not drop flame particles to ignite surgical absorbent cotton placed at 12 inches below the test specimen and (e) all test specimens are not accompanied by continued incandescence burning exceeding 30 seconds after the second test flame is removed.

In case that the sample did not satisfy the above-mentioned requirements (a) to (e), it was evaluated as "not conformable to UL-94V".
(2-2) Flammability Test Using a Cone Calorimeter A test specimen of 45×50×3 mm was made using the resulting pellet and a burning test was made using a cone calorimeter (Cone Calorimeter III, manufactured by Toyo Seiki Co., Ltd.) under a radiation heat condition of 30 kW/m$^2$ to measure momentary maximum heat release rate (kW/m$^2$), thereby evaluating its flame retardancy. The lower the maximum heat release rate, the better the flame retardancy is.
(2-3) Soapiness of Molded Articles A few droplets of water were dropped on the surface of the plate-like sample obtained just after molding to determine whether or not a soapiness was present when the plate was rubbed with a hand.

○: Soapiness was not felt at all or was not almost felt.

Δ: Soapiness was felt a little.

X: Soapiness was significant.

TABLE 1

|  | Examples | | | | | | | | Comparative Examples | | | |
| --- | --- | --- | --- | --- | --- | --- | --- | --- | --- | --- | --- | --- |
|  | 1 | 2 | 3 | 4 | 5 | 6 | 7 | 8 | 1 | 2 | 3 | 4 |
| (A) Polypropylene | 100 | 100 | 100 | 100 | 100 | 100 | 100 | 100 | 100 | 100 | 100 | 100 |
| (B) Melamine polyphosphate-1 | 33 | 33 | 30 | 33 | 33 | 33 | 33 |  | 35 | 35 |  |  |
| Melamine polyphosphate-2 |  |  |  |  |  |  |  | 33 |  |  |  |  |
| Ammonium polyphosphate-1 |  |  |  |  |  |  |  |  |  |  | 33 |  |
| Ammonium polyphosphate-2 |  |  |  |  |  |  |  |  |  |  |  | 33 |

TABLE 1-continued

|  | Examples | | | | | | | | Comparative Examples | | | |
| --- | --- | --- | --- | --- | --- | --- | --- | --- | --- | --- | --- | --- |
|  | 1 | 2 | 3 | 4 | 5 | 6 | 7 | 8 | 1 | 2 | 3 | 4 |
| (C) Dipentaerythritol | 16 | 16 | 10 | 16 | 16 |  |  | 16 | 7 | 7 | 16 | 16 |
| Dipentaerythritol adipate |  |  |  |  |  | 15 |  |  |  |  |  |  |
| Tripentaerythritol |  |  |  |  |  |  | 12 |  |  |  |  |  |
| (B)/(C) (mass ratio) | 2 | 2 | 3 | 2 | 2 | 2.2 | 2.75 | 2 | 5 | 5 | — | — |
| (D) Zinc borate |  | 3 |  |  |  | 3 |  | 3 | 3 |  |  |  |
| Cobalt oxide |  |  |  | 3 |  |  |  |  |  |  |  |  |
| Crystalline aluminosilicate |  |  | 3 |  | 3 |  | 3 |  |  |  | 3 | 3 |
| Result of UL test | V-O | V-O | V-O | V-O | V-O | V-O | V-O | V-O | not conformable to UL-94V | not conformable to UL-94V | V-O | V-O |
| Maximum heat release rate measured by using a cone calorimeter (kW/m$^2$) | 610 | 450 | 590 | 480 | 530 | 490 | 460 | 440 | 690 | 750 | 500 | 460 |
| Soapiness | ○ | ○ | ○ | ○ | ○ | ○ | ○ | X | Δ | ○ | X | X |

Examples 1 to 7 each had a V-0 level of flame retardancy and were free from soapiness on the surface of a molded article. Example 8 had a V-0 level of flame retardancy but had significant soapiness on the surface of a molded article. It may be modified according to use. Comparative Examples 1 and 2 had an insufficient flame retardancy since the ratio of (B) melamine polyphosphate to the (C) carbonizing agent was 5 in these examples, but the soapiness of a molded article was not impaired in these examples. Comparative Examples 3 and 4 had a V-0 level of flame retardancy since ammonium polyphosphate-1 or ammonium polyphosphate-2 was compounded in these examples, but the soapiness of a molded article was significant and the contamination of a mold during press molding was significantly found.

What is claimed is:

1. A flame retardant polyolefin resin composition comprising (A) 100 parts by mass of a polyolefin resin, (B) 10 to 60 parts by mass of melamine polyphosphate and (C) 10 to 60 parts by mass of a carbonizing agent, wherein the compounding mass ratio (B)/(C) of the component (B) to the component (C) is in a range from 0.5 to 4.5 and the ratios between the area of a peak a detected in a range from +5 to −5 ppm, the area of a peak b detected in a range from −5 to −17 ppm and the area of a peak c detected in a range from −17 to −32 ppm fulfill the following relationships (I) and (II) in a solid NMR spectrum obtained by a DD-MAS method using, as the observation nucleus, phosphorus of the melamine polyphosphate:

(I) area of peak b/area of peak c ≧ 2; and (II) area of peak a/area of peak b+area of peak c ≦ 0.1.

2. The flame retardant polyolefin resin composition according to claim 1, which further comprises (D) 1 to 30 parts by mass of a carbonizing promoter.

3. The flame retardant polyolefin resin composition according to claim 1, wherein the polyolefin resin for the component (A) is polypropylene.

4. The flame retardant polyolefin resin composition according to claim 1, wherein the component (B) contains melam and/or melem other than melamine as the counter cation of the polyphosphoric acid.

5. The flame retardant polyolefin resin composition according to claim 1, wherein the carbonizing agent which is the component (C) is at least one compound selected from pentaerythritol, dipentaerythritol, tripentaerythritol and esters of these compounds.

6. The flame retardant polyolefin resin composition according to claim 2, wherein the carbonizing promoter which is the component (D) is at least one compound selected from zinc borate, manganese oxide, silicon oxide and aluminosilicate.

7. The flame retardant polyolefin resin composition according to claim 1, which further comprises a filler.

8. A molded article obtained from the flame retardant polyolefin resin composition according to claim 1.

9. The flame retardant polyolefin resin composition of claim 1, wherein (I) area of peak b/area of peak c ≧ 3.

10. The flame retardant polyolefin resin composition of claim 1, wherein (I) area of peak b/area of peak c ≧ 3.5.

11. The flame retardant polyolefin resin composition of claim 1, wherein (II) area of peak a/area of peak b+area of peak c ≦ 0.08.

12. The flame retardant polyolefin resin composition of claim 1, wherein (II) area of peak a/area of peak b+area of peak c ≦ 0.05.

* * * * *